United States Patent
King et al.

(10) Patent No.: US 7,547,058 B2
(45) Date of Patent: Jun. 16, 2009

(54) SYSTEM AND METHOD FOR OPERATING AN AUTOMOTIVE LIFTGATE

(75) Inventors: Daniel King, Northville, MI (US); Greg Conner, Ann Arbor, MI (US); Ryan Hanson, Livonia, MI (US); Michael Wrobel, Jr., Brownstown, MI (US); Colm Deloughery, Berkley, MI (US); Dennis Montville, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 11/383,234

(22) Filed: May 15, 2006

(65) Prior Publication Data

US 2007/0262609 A1 Nov. 15, 2007

(51) Int. Cl.
*B60J 5/02* (2006.01)
(52) U.S. Cl. .................................. 296/146.8
(58) Field of Classification Search ............. 296/146.8, 296/56; 318/445–489, 280–300; 49/26–28, 49/360
See application file for complete search history.

(56) References Cited

U.S. PATENT DOCUMENTS

| | | | | |
|---|---|---|---|---|
| 5,003,136 | A | * | 3/1991 | Valenzona ................. 292/338 |
| 5,982,126 | A | * | 11/1999 | Hellinga et al. ............... 49/28 |
| 6,100,796 | A | * | 8/2000 | Wagner et al. ............. 340/435 |
| 6,456,916 | B1 | | 9/2002 | Edgar et al. |
| 6,469,524 | B1 | | 10/2002 | Oberdier |
| RE38,400 | E | | 1/2004 | Kowall et al. |
| 6,719,356 | B2 | * | 4/2004 | Cleland et al. ........... 296/146.8 |
| 6,901,704 | B2 | | 6/2005 | Sakaue et al. |
| 2002/0084675 | A1 | * | 7/2002 | Buchanan et al. ........ 296/146.8 |
| 2004/0124662 | A1 | * | 7/2004 | Cleland et al. ........... 296/146.4 |
| 2008/0250720 | A1 | * | 10/2008 | Oxley et al. ................. 49/358 |

* cited by examiner

*Primary Examiner*—Lori L Lyjak
(74) *Attorney, Agent, or Firm*—Dickinson Wright PLLC; Greg Brown

(57) ABSTRACT

A system for operating an automotive liftgate includes a motor drive adapted for positioning the liftgate, and at least one telescopic strut positioned between the liftgate and an adjacent body structure. A controller operates the motor drive so as to place the liftgate in a predetermined position, such as a fully closed or fully opened position, in the event that a sensor detects unintended movement of the liftgate.

9 Claims, 6 Drawing Sheets

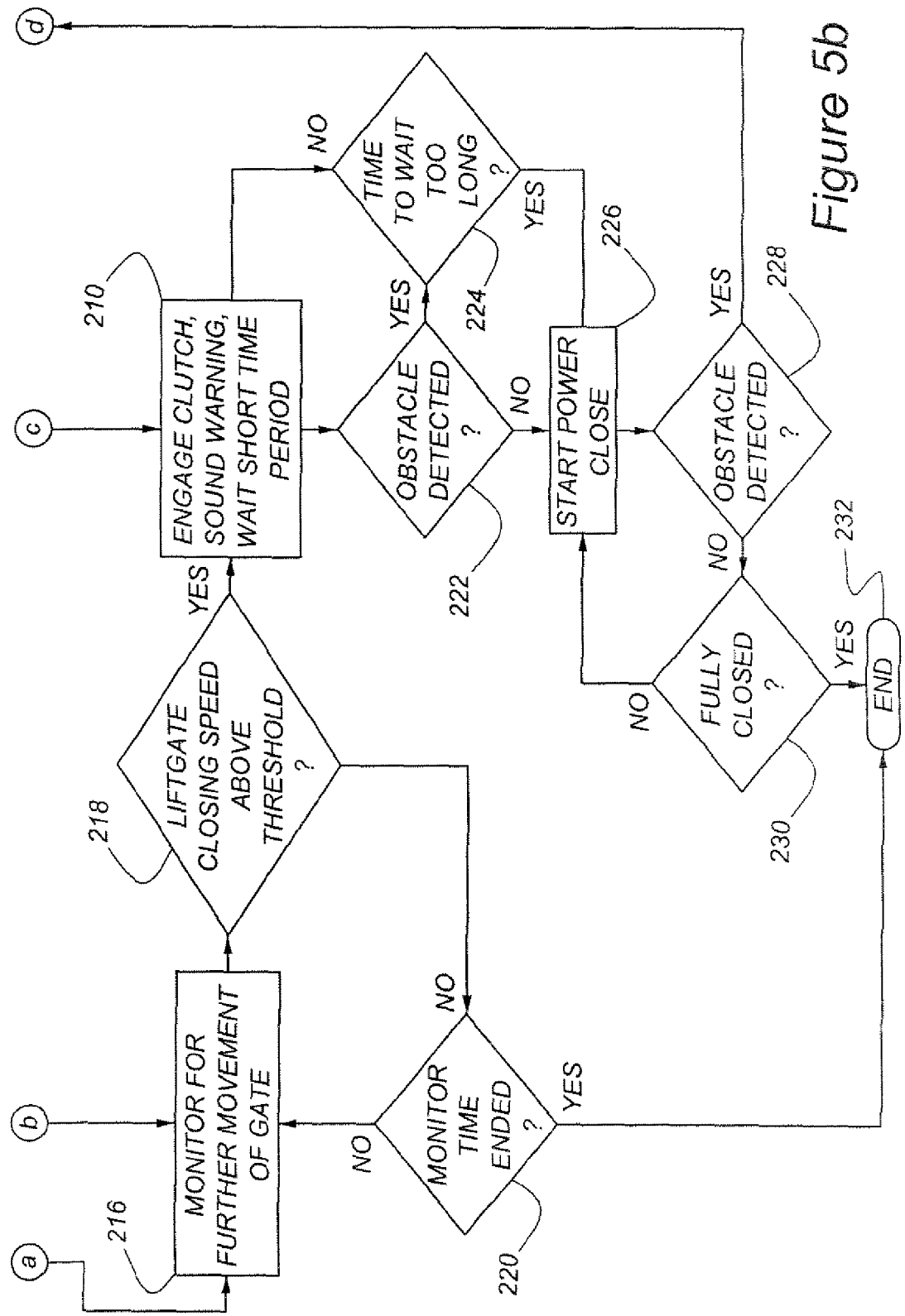

SYSTEM AND METHOD FOR OPERATING AN AUTOMOTIVE LIFTGATE

BACKGROUND OF THE INVENTION

1. Field of the Invention

The present invention relates to an electronically controlled motor-driven system and operating method for powering a liftgate of an automotive vehicle. Although such liftgates are typically used at the rearmost part of vehicles, the present method and system may be employed with liftgates or doors used at a variety of locations on the exterior of an automotive vehicle.

2. Disclosure Information

As first used, automotive liftgates were most often manually operated. A pair of gas-filled or spring-loaded struts provided the force required to maintain the liftgate in its uppermost position, as well as assisting the motorist in opening the liftgate. Motor driven liftgates are a relatively new addition to the automotive genre. A motor drive typically powers the liftgate to its uppermost, or fully opened, position. When the liftgate is fully opened, the drive is typically declutched, allowing the gate to be maintained at its uppermost position by means of gas-charged telescoping struts. If however, the liftgate must bear the weight of a significant accumulation of ice, or an accessory such as a bicycle rack, it may be possible in certain cases for the combined weight to overcome the capability of the gas-filled struts, thereby allowing the liftgate to close in an unintended manner.

Designers of power liftgates have looked at controlling various operating features of the liftgate, such as closing speed under power, and a system for accomplishing this purpose is disclosed in U.S. Pat. No. 6,901,704. The system of the '704 patent does not, however, monitor either the position or unintended movement of the liftgate when it is in its opened position. U.S. Pat. No. 6,719,356 discloses a liftgate operating system having a proximity sensor which is used to stop operation of the liftgate. The system of the '356 patent again, however, does not monitor the liftgate when it is in a fully opened position to assure that the liftgate does not move out of control in an unintended fashion.

A method and system according to the present invention functions to prevent unintended movement of a liftgate regardless of the condition or load capacity of the telescoping struts normally assigned the task of maintaining the liftgate in an opened position.

SUMMARY OF THE INVENTION

A system for operating an automotive liftgate includes at least one telescopic strut adapted to be positioned between a liftgate and an adjacent door opening panel. As used herein, the term "liftgate" means either a conventional top-hinged tailgate, or a side door for a vehicle which rotates in a generally vertical plane, or yet other closure structures having a significant vertical component in their operating paths. The present system may also be employed with yet other types of automatically operated doors which may be caused by gravity to move unintentionally.

According to one aspect of the present invention, a motor drive is adapted for positioning the liftgate. The motor drive preferably includes a motor, an actuator powered by the motor, with the actuator being interposed between the motor and a liftgate, and a clutch interposed between the motor and the actuator. A sensor detects movement of the liftgate. A controller connected with the clutch, the motor, and the sensor, operates the motor and the clutch, with the controller commanding the motor drive to place the liftgate in a predetermined position in the event that the sensor detects unintended movement of the liftgate. The sensor may be embodied as an encoder operatively associated with the actuator. The actuator preferably comprises a lead screw driven by the motor, with the encoder counting the revolutions of the lead screw.

In the event that the actuator's sensor detects unintended movement of the liftgate, the controller will command the motor drive to close the liftgate. Alternatively, the motor drive may be commanded to maintain the liftgate in an opened position. The latter option is particularly useful when the present system further includes an obstacle sensor, operatively connected with the system controller, for detecting an obstacle in the operating path of the liftgate. As yet another alternative, if an obstacle sensor detects an obstacle in the operating path of the liftgate, the controller may command the motor drive to maintain the liftgate in an existing position.

A liftgate operating system according to the present invention may further include a load cell interposed between the actuator and the liftgate, with the load cell being operatively connected with the controller. In this configuration, the controller may be programmed to command the motor drive to place the liftgate in a predetermined position in the event that the static force exerted by the liftgate upon the actuator and load cell increases above a predetermined threshold.

According to another aspect of the present invention, an automotive vehicle having the liftgate and operating system described herein may be used in conjunction with a reverse/park aid, operatively connected with the obstacle sensor, for alerting a motorist in the event that the vehicle is being operated in reverse gear and an obstacle is located behind the vehicle.

According to yet another aspect of the present invention, a method for operating a power liftgate installed in an automotive vehicle includes the steps of commanding a motor drive to place the liftgate in an open position, and monitoring the time rate of change of position of the liftgate after the liftgate has been opened. In the event that the liftgate begins to move into an unintended position after opening, the motor drive will be commanded to place the liftgate in a predetermined position. The present method may also include the steps of monitoring the operating path of the liftgate for obstacles and commanding the motor drive to maintain the liftgate in a preexisting position if an obstacle is detected in the liftgate's path.

According to yet another aspect of the present invention, the present method includes the steps of commanding a motor drive to place the liftgate in an opened position and releasing a motor drive clutch when the open position has been reached, such that the liftgate is supported solely by a plurality of telescoping struts, followed by monitoring of the liftgate's subsequent position. This method further includes engaging the clutch and commanding the motor drive to place the liftgate in a closed position in the event that the liftgate moves to an unintended position. At the same time, an alarm may be sounded to alert a vehicle operator.

It is an advantage of a method and system according to the present invention that sensors used with a vehicle's reverse/park aid system may be used not only to alert a motorist if an obstacle is behind a vehicle and the vehicle is being backed up, but the sensors may also be used to aid in the operation of a powered liftgate, including advising a motorist that an obstacle is adjacent to the liftgate. This will allow the motorist to correct an abnormal condition before the liftgate is cycled.

It is a further advantage of a method and system according to the present invention that a liftgate may be operated within a defined set of parameters even in the event that a gas-filled telescopic strut becomes incapable of exerting sufficient opening force upon the liftgate.

It is yet another advantage of the present method and system that this method and system allow increased flexibility regarding usage of remote operating devices with a powered vehicular liftgate.

It is yet another advantage of the present method and system that this method and system allows for monitoring of movement at the end of a liftgate's power open operation, regardless of whether a fully opened position is reached. This is important because there are several reasons for terminating power open operation before the normal end of travel is reached.

Other advantages, as well as objects and features of the present invention, will become apparent to the reader of this specification.

DETAILED DESCRIPTION OF THE PREFERRED EMBODIMENTS

Figure 1:
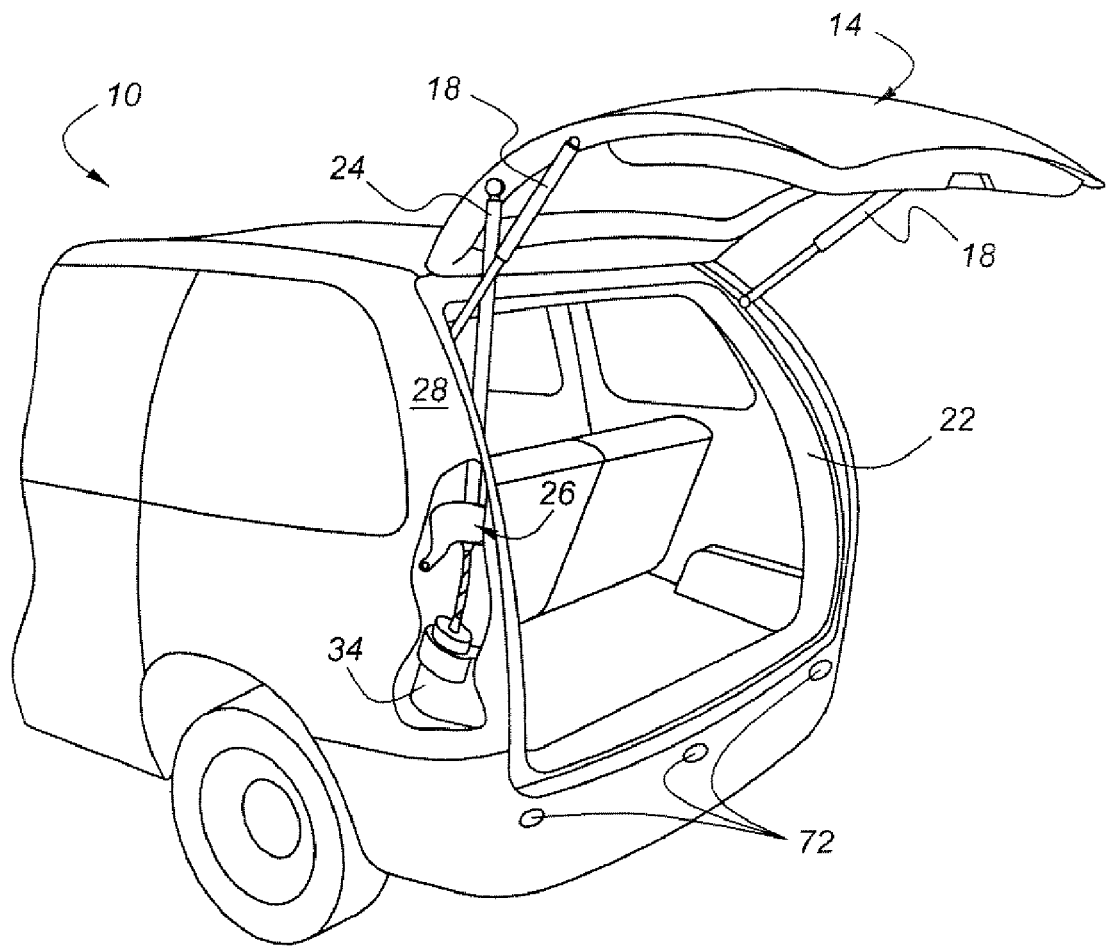
FIG. 1 is a perspective view of an automotive vehicle having a powered liftgate according to the present invention.

As shown in FIG. 1, vehicle 10 has liftgate 14, which is normally maintained in its fully opened position by means of telescoping struts 18. Liftgate 14 and struts 18 are both attached at one end to door opening panel 22. Motor drive 26 is interposed between liftgate 14 and a portion of the body's D-pillar, 28. FIG. 1 also shows a plurality of obstacle sensors, 72, which are mounted to the rear portion of vehicle 10. Obstacle sensors 72 are used not only to control operation of liftgate 14, but may also be employed as part of a reverse/park aid to alert the motorist of obstacles behind vehicle 10.

Figure 2:
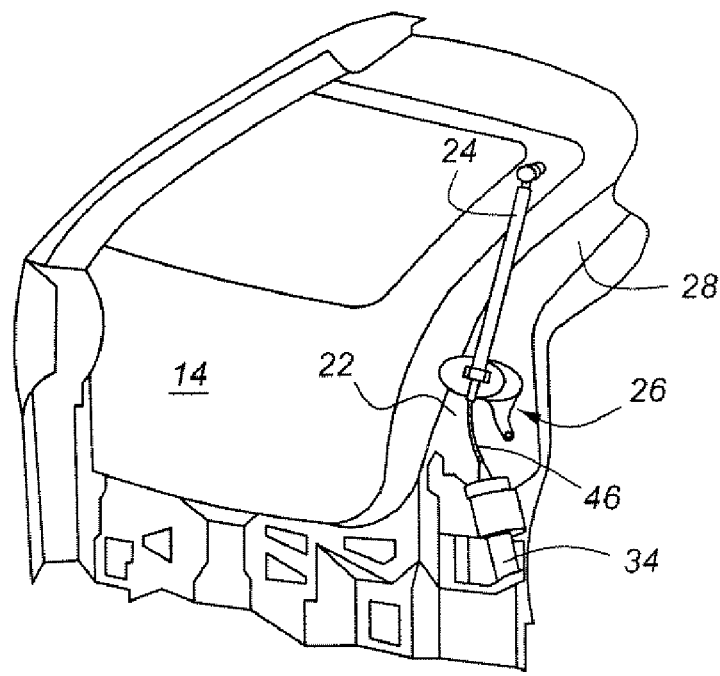
FIG. 2 is an internal view of a portion of the vehicle shown in FIG. 1, showing mounting and positioning of the present liftgate operating system.

FIG. 2 illustrates the mounting of motor drive 26 to D-pillar 28 and to liftgate 14. Note that motor drive 26 extends between D-pillar 28 and liftgate 14 in much the same manner as telescoping struts 18 illustrated in FIG. 1. FIG. 2 also shows the mounting locations of actuator 24, motor 34, and drive cable 46.

Figure 3:
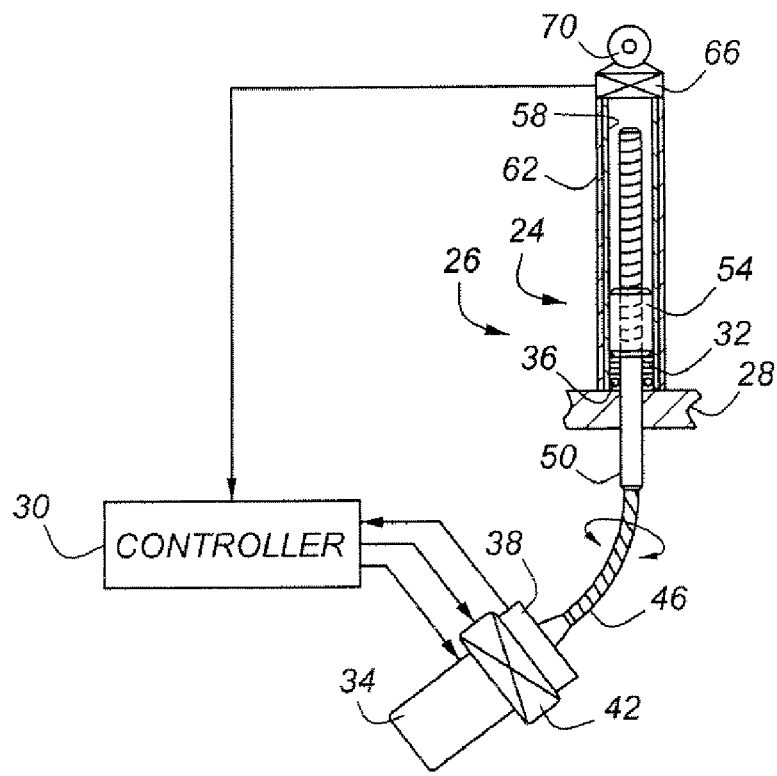
FIG. 3 illustrates various details of a motor drive and actuating system according to the present invention.

FIG. 3 shows various details of motor drive 26. Controller 30 is connected with motor 34 as well as with load cell 66 and encoder 38. Motor 34 drives a lead screw, 50, through clutch 42, which is also operated by controller 30. Because motor 34 drives lead screw 50 by means of a spring cable, 46, freedom of placement of motor 34, clutch 42 and encoder 38 is allowed. The encoder monitors the rotation of lead screw 50, so as to allow controller 30 to track the precise location of liftgate 14 at all times. Supported by collar 32 and bearing 36, lead screw 50 rotates within nut 54, which is attached to inner tube 58. As lead screw 50 rotates, nut 54 causes inner tube 58 to move either up or down with respect to outer tube 62, which is grounded to D-pillar 28. Load cell 66 is interposed between actuator 24 and liftgate 14 and moves with inner tube 58. Load cell 66 measures the static force exerted by liftgate 14 upon actuator 24, and thereby allows load cell 66 and controller 30 to monitor the condition and loading upon struts 18, as well as allowing load cell 66 to monitor unusual conditions affecting of liftgate 14, such as a heavy accumulation of ice, or the mounting of accessory equipment upon liftgate 14. Those skilled in the art will appreciate in view of this disclosure that other types of drive mechanisms other than a lead screw driven machine may be employed to practice the present invention.

Encoder 38, as noted above, monitors the location of liftgate 14 by counting revolutions of lead screw 50. In essence, the signals from encoder 38 may be used by controller 30 to detect the time rate of change of position of liftgate 14, as described in the following method.

Figure 4A:
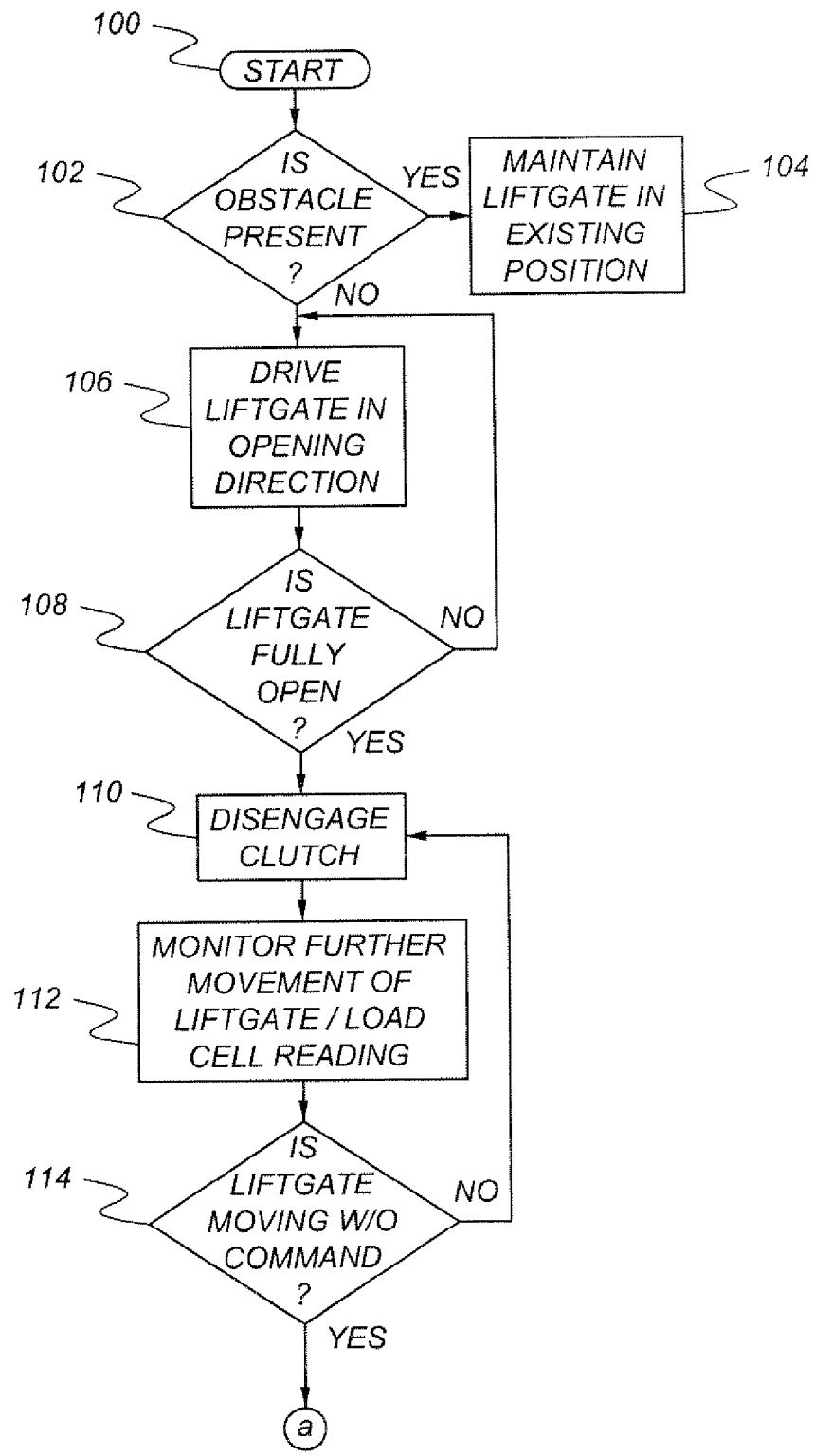
FIG. 4 is a flowchart illustrating a first mode of operation according to the present inventive method.
Figure 4B:
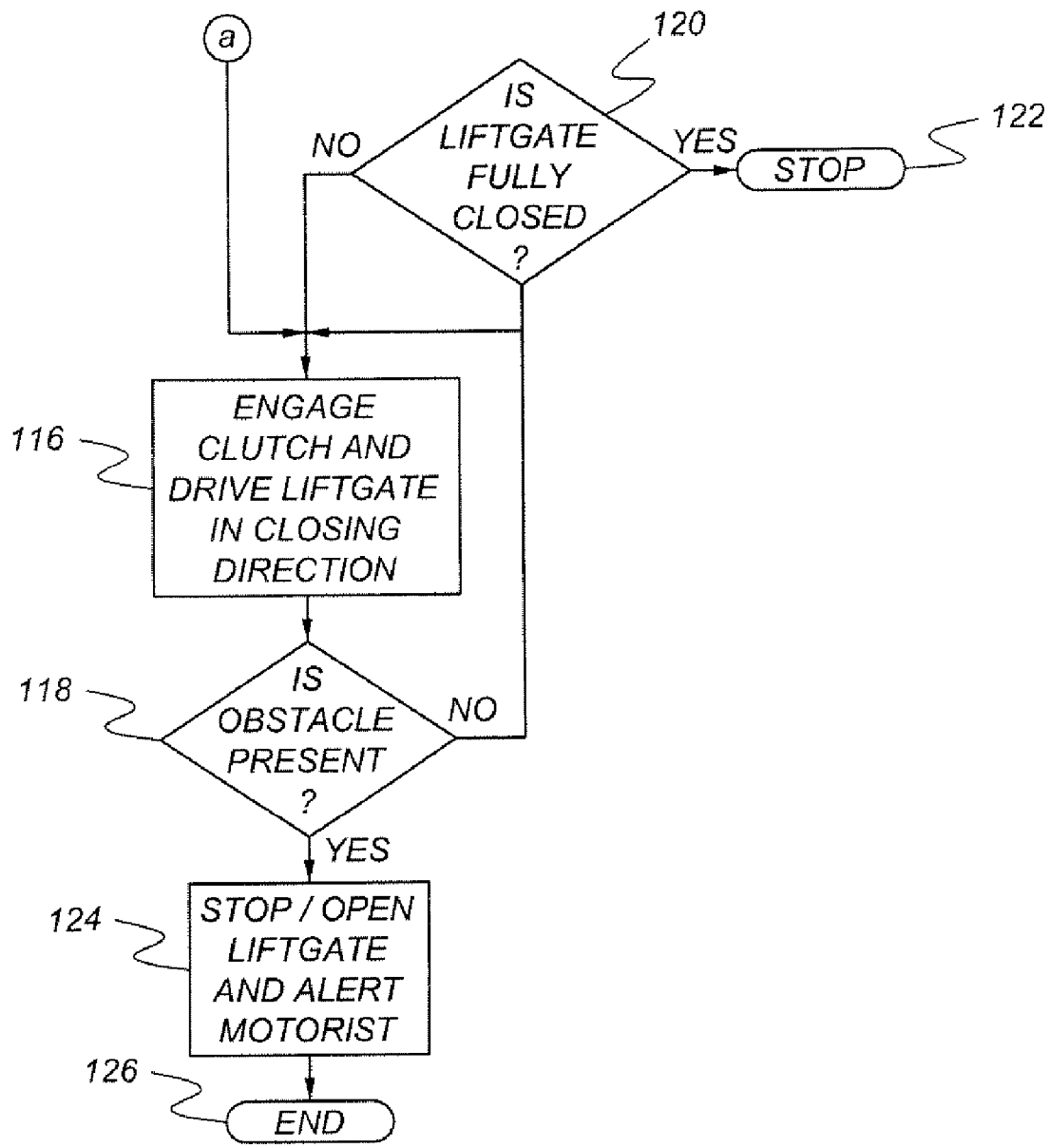

As shown in FIG. 4, beginning at start at block 100, a software routine within controller 30 moves to block 102 wherein a question is asked regarding whether an obstacle is present behind vehicle 10, and more precisely, liftgate 14. If the answer is yes at block 102, the routine moves to block 104, wherein liftgate 14 is maintained in its existing position for a period of time sufficient to allow the vehicle operator to clear the path of the liftgate. If, however, the answer is "no" at block 102, the routine moves to block 106 wherein the liftgate is driven in an opening direction. In block 108, the routine inquires as to whether liftgate 14 is fully opened. If it is not, the routine continues with block 106. If however liftgate 14 is completely open at block 108 the routine moves to block 110, wherein clutch 42 is disengaged. This will allow liftgate 14 to be supported by struts 18, without the need for any further energization of motor 34. Thereafter, at block 112, controller 30 uses encoder 38 and if so equipped, load cell 66 to monitor further movement of liftgate 14. In essence, encoder 38 and controller 30 perform a time based differentiation of the location of liftgate 14 and thereby determine whether liftgate 14 is moving. If such movement has not been commanded by the motorist, the routine answers yes at block 114, and moves to block 116, wherein clutch 42 is engaged and motor 34 is directed to drive liftgate 14 in its closing direction. Then, at block 118 a question is asked as to whether an obstacle is present, as detected by obstacle sensor 72. If no obstacle is present, the closing process continues at block 120, wherein a question is asked as to whether the liftgate 14 is fully closed. If liftgate 14 is fully closed, the process ends at block 122. If however, liftgate 14 is not fully closed at block 120, the routine continues at block 116.

If an obstacle is present at block 118, the routine moves to block 120, wherein liftgate 14 is stopped if it is nearing its closed position, for example, or opened once again, if it is not far from its fully opened position. Then, the routine continues with an alert to the motorist at block 121 and ends at block 126.

As noted above, the obstacle detection and driver alert componentry described herein, such as sensors 72, may be beneficially used as part of a reverse/park aid system to alert a motorist when an obstacle is behind a vehicle that is being operated in reverse gear. In this regard, the program steps 118 and 124 may function as part of a park/reverse warning system.

Figure 5A:
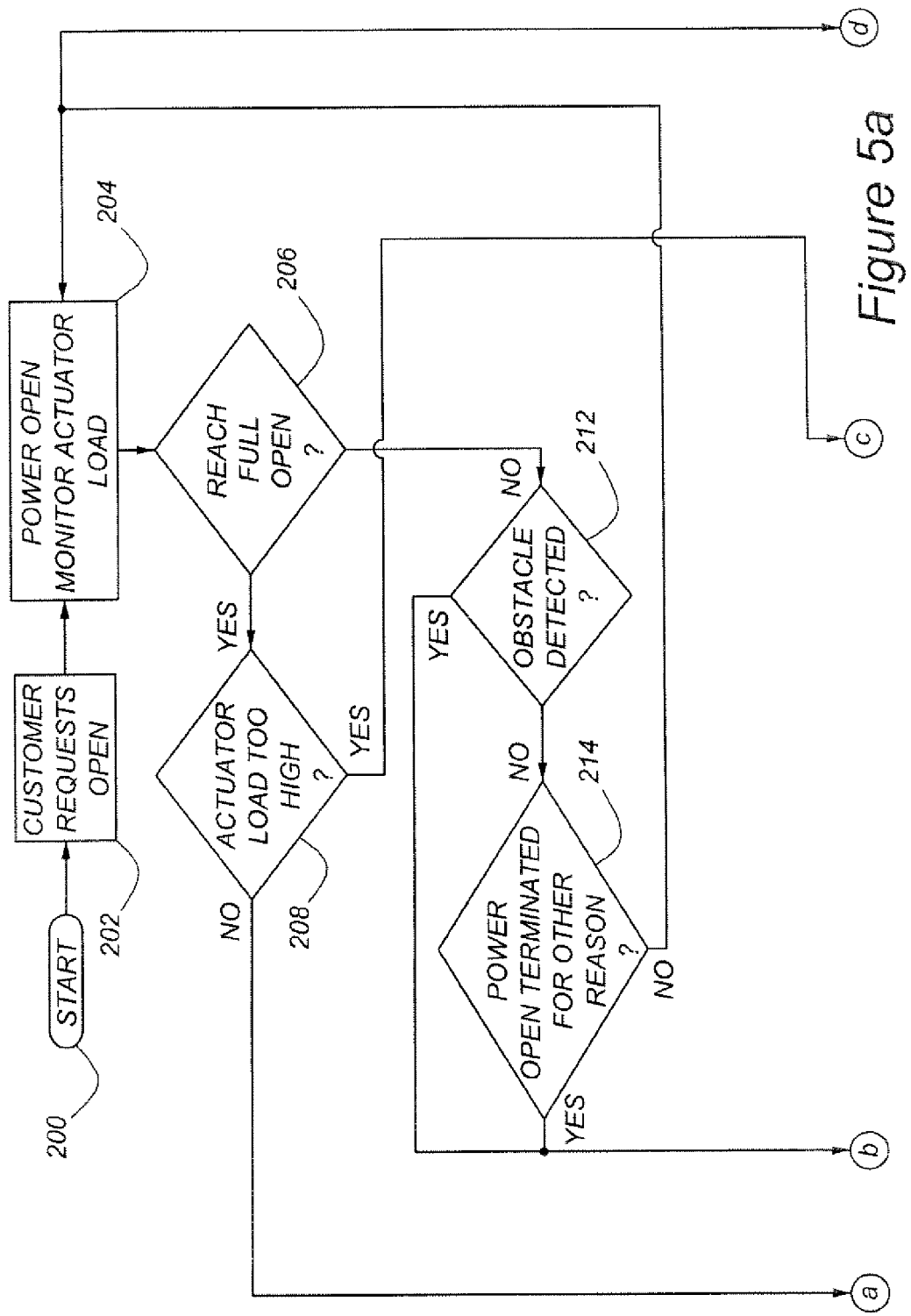
FIG. 5 is a flowchart illustrating a second mode of operation according to the present inventive method.

FIG. 5 illustrates a second mode of operation including the use of load cell 66. Beginning at block 200, controller 30 moves to block 202, wherein a motorist request for liftgate opening is received. At block 204, the controller drives liftgate 14 in the open direction, while monitoring the load by means of load cell 66. At block 206 a question is asked regarding the opening status. If the answer at block 206 is "yes", liftgate 14 is fully open, and the routine moves to block 208, wherein the actuator load is assessed. If the load, as measured by load cell 66, is too high at block 208, the routine moves to block 210, wherein clutch 42 is engaged and a warning is sounded. Then, after a short time interval, the routine moves to block 222, wherein the presence of an obstacle is inquired into. If there is no obstacle at block 222, the routine moves to block 226, wherein liftgate 14 is closed with actuator 24. If, alternatively, there is an obstacle, the routine continues with block 224, wherein a timer, tracking the obstacle, is set. Once the timer times out, the routine moves to block 226. If an obstacle is detected at block 228, the routine moves once again to block 204, where liftgate 14 will be opened. If no obstacle is detected at block 228, and if liftgate 14 is fully closed at block 230, the routine ends at block 232. If, however, the liftgate is not fully closed at block 230, the liftgate is redirected to close at block 226.

Continuing once again with block 208, if the actuator load is not too high, the routine moves to block 216, wherein encoder 38 and controller 30 monitor liftgate 14 for further movement. Thus, at block 218, if liftgate 14 is closing at a speed above a threshold, the routine will continue as before at block 210. If liftgate 14 is not closing in an unintended manner, the routine looks at a monitor timer at block 220, and either continues monitoring at block 216, or ends at block 232.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. A system for operating an automotive liftgate, comprising:
    at least one telescopic strut adapted to be positioned between a liftgate and an adjacent door opening panel;
    a motor drive adapted for positioning a liftgate, with said motor drive comprising:
    a motor;
    an actuator powered by the motor, with said actuator being interposed between the motor and a liftgate, wherein said actuator comprises a lead screw driven by said motor, and an actuator sensor having an encoder for counting the revolutions of said lead screw;
    a clutch interposed between the motor and the actuator; and
    a controller, connected with said clutch, said motor, and said actuator sensor, for operating said motor and said clutch, with said controller commanding the motor drive to place the liftgate in a predetermined position in the event that said actuator sensor detects unintended movement of the liftgate.

2. A system for operating an automotive liftgate according to claim 1, wherein said controller commands the motor drive to close the liftgate in the event that said sensor detects unintended movement of the liftgate.

3. A system for operating an automotive liftgate according to claim 1, wherein said controller commands the motor drive to maintain the liftgate in a preexisting position in the event that said sensor detects unintended movement of the liftgate.

4. A system for operating an automotive liftgate according to claim 1, further comprising an obstacle sensor, operatively connected with said controller, for detecting an obstacle in the operating path of said liftgate, with said controller commanding said motor drive to maintain the liftgate in an open position for a period of time in the event that an obstacle is detected within the liftgate operating path.

5. A system for operating an automotive liftgate according to claim 1, further comprising an obstacle sensor, operatively connected with said controller, for detecting an obstacle in the operating path of said liftgate, with said controller commanding said motor drive to maintain the liftgate in an existing position for a period of time in the event that an obstacle is detected within the liftgate operating path.

6. A system for operating an automotive liftgate according to claim 1, further comprising a load cell interposed between said actuator and the liftgate, with said load cell being operatively connected with said controller, and with said controller commanding said motor drive to place the liftgate in a predetermined position in the event that the static force exerted by the liftgate upon the actuator and load cell increases above a predetermined threshold.

7. A system for operating an automotive liftgate according to claim 1, wherein said sensor detects the time rate of change of position of the liftgate.

8. An automotive vehicle having the liftgate operating system of claim 1.

9. An automotive vehicle having the liftgate operating system of claim 5, further comprising a reverse/park aid operatively connected with said obstacle sensor, for alerting a motorist in the event that the vehicle is being operated in a reverse gear and an obstacle is located behind the vehicle.

* * * * *